Dec. 25, 1951    C. WOOD    2,579,991
FISH LURE
Filed March 9, 1949

Conrad Wood
INVENTOR
BY *CAKnowles.*
ATTORNEYS.

Patented Dec. 25, 1951

2,579,991

UNITED STATES PATENT OFFICE 2,579,991

FISH LURE

Conrad Wood, El Dorado, Ark., assignor to Wood Manufacturing Company, El Dorado, Ark.

Application March 9, 1949, Serial No. 80,447

1 Claim. (Cl. 43—42.47)

This invention relates to fish lures or artificial bait, an object of the invention being to provide a fish lure having a wobble plate secured at the front end thereof, the wobble plate having a tab punched therefrom and extending forwardly to which the fishing line is attached, the construction and location of the tab with respect to the wobble plate, insuring a center pull being directed to the lure as it is pulled through the water, eliminating undesirable side sway which causes the lure to veer from its true direct path of travel when in use.

Another object of the invention is to provide a wobble plate and tab which are constructed and arranged to permit of ready adjustment by the fisherman, adapting the lure for use under varying fishing conditions.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1:
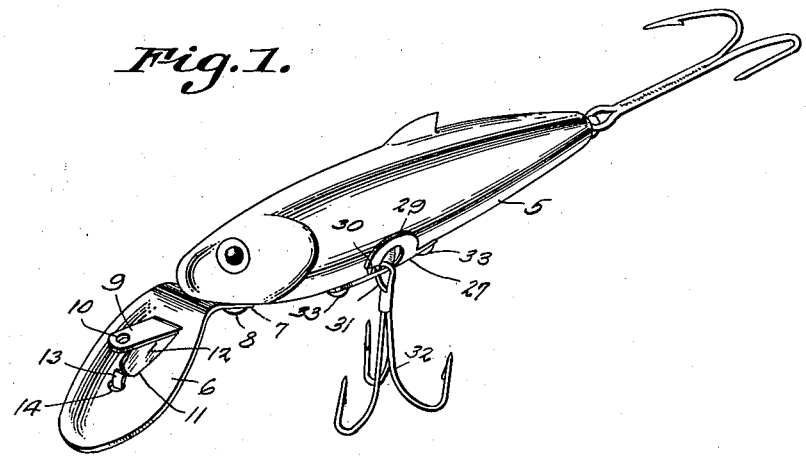
Figure 1 is a perspective view illustrating a fish lure constructed in accordance with the invention.
Figure 2:
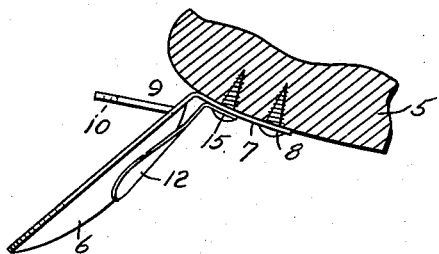
Fig. 2 is a fragmental sectional view through a portion of the body, illustrating the wobble plate as secured thereto, the wobble plate being shown in elevation.

Referring to the drawing in detail, the lure comprises a body portion 5 which is constructed to simulate a minnow such as commonly used in fishing as bait.

In order that the body portion will move through the water with movements simulating the usual fish, the wobble plate 6 is provided with an extension 7 formed with openings to accommodate the securing screws 8. As shown, the extension 7 is disposed substantially at right angles with respect to the main portion of the wobble plate, so that the wobble plate is directed downwardly and forwardly with respect to the body portion, when secured to the body portion. This wobble plate 6 is spoon-like in construction and has the tab 9 stamped therefrom and extended forwardly. This tab is wide and formed with an opening 10 through which the fishing line may be extended and secured, to attach the body portion to the fishing line. Due to this construction, it will be seen that the tab may be adjusted vertically so that the direction of the line of pull may be changed to cause a varying action of the wobble plate. That is to say, by extending the tab upwardly from the position as shown by Fig. 1, the pull on the body portion directed thereto by the line would be to cause the wobble plate to dig deeper into the water. If the tab is bent in the opposite direction, the tendency would be to elevate the forward end of the body portion.

When the tab is constructed, an opening 11 is formed in the wobble plate and this opening is closed by means of the plate 12 which is formed with a narrow end portion 13 that extends through the opening 14 formed in the wobble plate between the front end thereof and the front end of the opening 11, the end 13 being bent over the wobble plate to secure the plate 12 thereto. This plate 12 is also provided with a tab 15 formed with an opening to receive one of the screws 8 used in securing the plate 12 in position. This plate 12 not only acts as a means to close the opening 11, but at the same time affords a support for the wobble plate to prevent the wobble plate from bending or being broken off, should the bait be pulled over rocks or become caught in vegetation on the bed of the water in which the artificial bait is being used.

It is generally understood that variations in the center of pull on the lure where the line is fastened to the lure, greatly affect the movements of the lure as it is drawn through the water. Variations in the center of pull from side to side are very undesirable, and cause the lure to veer off the path to the right or left and frequently cause the lure to jump out of the water. With applicant's structure, it is an easy matter to bend the tab to eliminate the undesirable movement, since the tab is of sufficient width to permit of ready bending to the desired position.

It is further pointed out that the tab may be bent to cause the center of pull to be in a vertical direction as desired, which movement causes the lure body to vibrate or wiggle to a different degree.

Having thus described the invention what is claimed is:

In a fish lure, a body portion constructed to simulate a fish, a wobble plate of spoon shape secured to one end of the body portion and extending downwardly and forwardly therefrom and having a transverse opening therein, an elongated bendable tab extending forwardly from the wobble plate, said tab being punched from the wobble plate providing a central opening in the wobble plate, said tab being extended beyond the surface of the wobble plate, said tab having an opening therein for receiving a fishing line, a guard plate curved to the curvature of the spoon shape of the wobble plate and fitted thereagainst substantially closing the central opening, one end of the guard plate being secured to the body portion, and the opposite end portion of the guard plate extending through the transversely disposed opening in the wobble plate and securing the free end of the guard plate to said wobble plate.

CONRAD WOOD.

REFERENCES CITED

The following references are of record in the file of this patent:

UNITED STATES PATENTS

| Number | Name | Date |
| --- | --- | --- |
| 2,217,789 | Bobo | Oct. 15, 1940 |
| 2,435,932 | Smith | Feb. 10, 1948 |
| 2,473,324 | Adam et al. | June 14, 1949 |